US010023021B2

(12) United States Patent
Weber et al.

(10) Patent No.: US 10,023,021 B2
(45) Date of Patent: Jul. 17, 2018

(54) AIR VENT

(71) Applicant: Illinois Tool Works Inc., Glenview, IL (US)

(72) Inventors: Jonathan Weber, Dittweiler (DE); Andrew LeFever, Remering (FR)

(73) Assignee: Illinois Tool Works Inc., Glenview, IL (US)

( * ) Notice: Subject to any disclaimer, the term of this patent is extended or adjusted under 35 U.S.C. 154(b) by 270 days.

(21) Appl. No.: 14/551,115

(22) Filed: Nov. 24, 2014

(65) Prior Publication Data
US 2015/0151607 A1 Jun. 4, 2015

(30) Foreign Application Priority Data

Dec. 2, 2013 (DE) .......................... 10 2013 113 319

(51) Int. Cl.
| | | |
|---|---|---|
| *B60H 1/00* | (2006.01) | |
| *F24F 13/06* | (2006.01) | |
| *B60H 1/34* | (2006.01) | |
| *B60Q 3/64* | (2017.01) | |
| *B60Q 3/20* | (2017.01) | |
| *F24F 13/14* | (2006.01) | |

(52) U.S. Cl.
CPC .......... *B60H 1/00207* (2013.01); *B60H 1/34* (2013.01); *B60H 1/3414* (2013.01); *B60Q 3/20* (2017.02); *B60Q 3/64* (2017.02); *F24F 13/06* (2013.01); *B60H 2001/00228* (2013.01); *B60H 2001/3478* (2013.01); *B60Q 2500/20* (2013.01); *F24F 2013/1446* (2013.01)

(58) Field of Classification Search
USPC .................................................. 454/152, 305
See application file for complete search history.

(56) References Cited

U.S. PATENT DOCUMENTS 3,530,615 A * 9/1970 Meyer ...................... A63F 9/06
                                                       40/437
6,224,221 B1   5/2001 Glienicke
(Continued)

FOREIGN PATENT DOCUMENTS

| CN | 1795426 | 6/2006 |
|---|---|---|
| CN | 102792243 | 11/2012 |

(Continued)

OTHER PUBLICATIONS

Habert, English translation of FR2939208, "Display device for use on e.g. fascia of motor vehicle", Jun. 4, 2010.*
Pictures of the HVAC operating panel, year manufactured 2010.

*Primary Examiner* — Gregory Huson
*Assistant Examiner* — Ryan Faulkner
(74) *Attorney, Agent, or Firm* — Joseph M. Butscher; The Small Patent Law Group, LLC

(57) ABSTRACT

An air vent with an adjustment insert for adjusting an air stream flowing out through the air vent, can be adjusted by rotating the adjustment insert. A first light guide and a second light guide are provided, with the first light guide being firmly attached to a housing of the air vent and the second light guide being firmly attached to the adjustment insert. The first light guide and the second light guide are rotatable with respect to each other, and the second light guide can be illuminated by the first light guide. A backlightable portion of the adjustment insert can be illuminated by the second light guide.

20 Claims, 5 Drawing Sheets

(56) References Cited

U.S. PATENT DOCUMENTS

| | | | |
|---|---|---|---|
| 6,685,327 B2 * | 2/2004 | Dorrie | H01H 19/025 362/23.04 |
| 8,834,241 B2 | 9/2014 | Uhlenbusch | |
| 2002/0075668 A1 | 6/2002 | Dorrie | |
| 2003/0150371 A1 | 8/2003 | Snider | |
| 2009/0298406 A1 * | 12/2009 | Norbury, Jr. | B60H 1/34 454/69 |

FOREIGN PATENT DOCUMENTS

| | | | | |
|---|---|---|---|---|
| DE | 8851072 | | 1/1989 | |
| DE | 4033625 | | 4/1992 | |
| DE | 19735858 | | 8/1998 | |
| DE | 20118014 | | 3/2002 | |
| DE | 102006011125 | | 9/2007 | |
| DE | 202009005100 | | 12/2009 | |
| DE | 202011110265 | | 5/2013 | |
| EP | 1832452 | | 9/2007 | |
| FR | 2939208 | * | 6/2010 | ......... B60H 1/00985 |
| JP | 2010143338 | | 7/2010 | |

* cited by examiner

AIR VENT

BACKGROUND OF THE INVENTION

The present invention relates to an air vent.

From the prior art, air vents for motor vehicles are known already. The air vents are used for example for ventilating and for air-conditioning the interior of the motor vehicle.

The air vent can be used for adjusting direction and volume of the air stream flowing into the vehicle interior space. For this purpose, slats or inserts as well as flaps are provided at the air vent.

To provide for operating these air vents also in the dark, e.g. when driving at night, the air vents partly are illuminated.

From the prior art, air vents for motor vehicles are known already, which are backlit.

DE 20 2011 110 285 U1 for examples describes a ventilation device for a vehicle, wherein the ventilation device includes an outflow nozzle and lamps. The lamps indicate whether the air stream can flow from the outflow nozzle into the vehicle interior.

DE 201 18 014 U1 discloses an air nozzle for emitting an air stream from an air supply duct. The air nozzle includes a control element which provides for adjusting the slats of the air nozzle. This control element includes a backlightable light exit portion, which reveals the orientation of the control element and hence of the air stream in the dark.

Therefore, it is the object of the present invention to develop an air vent as mentioned above in an advantageous way, in particular to the effect that an operation of the air vent is easily and intuitively possible also at night.

BRIEF DESCRIPTION OF THE INVENTION

In order to achieve this object, an air vent with an adjustment insert for adjusting the air stream flowing out through the air vent is provided, the air flow being adjustable rotating the adjustment insert. At least a first light guide and at least a second light guide are provided, with the first light guide being firmly attached to a housing of the air vent and the second light guide being firmly attached to the adjustment insert. The first light guide and the second light guide are rotatable with respect to each other, and the second light guide can be illuminated by the first light guide. A backlightable portion of the adjustment insert can be illuminated by the second light guide.

According to the invention, an air vent includes an adjustment insert for adjusting the air stream flowing out through the air vent, wherein the air stream is adjustable by rotating the adjustment insert, comprising at least one first light guide and at least one second light guide, wherein the first light guide is firmly attached to a housing of the air vent and the second light guide is firmly attached to the adjustment insert. The first light guide and the second light guide are rotatable against each other, and the second light guide can be illuminated by the first light guide. Furthermore, a backlightable portion of the adjustment insert can be illuminated by the second light guide. This provides the advantage that the air vent according to the invention is easily and intuitively operable also in the dark. Backlighting the air vent does not require an expensive construction, but can be realized with a simple construction. Via one or more LEDs light can be introduced into the first light guide and from there be passed on into the second light guide. Rotating the backlightable portion in particular is effected synchronously to the rotation of the adjustment insert with which the air stream flowing out through the air vent is adjusted. The illumination of the second light guide is effected homogeneously over the entire adjustment range. Consequently, the backlightable portion is illuminated in essence with the same intensity substantially over the entire adjustment range. With reference to the position of the backlightable portion, the rotation of the adjustment insert and hence the adjustment or intensity of the air stream flowing out through the air vent can easily and reliably be read and possibly be adjusted correspondingly.

The used LED respectively light emitting diode may be a RGB colour light emitting diode (RGB-LED). This allows the driver to freely adjust or select the colour of the illumination. It is also possible that the colour of the illumination is preselectable or adjustable according to driving modes of the manufacturer. For example, an ECO mode may have a green illumination and a sport mode a red illumination etc.

Moreover, it is possible that the first light guide is at least partially made of a illuminatable foil. This provides the advantage that no LEDs must be used.

Furthermore, it can be provided that the adjustment insert comprises an adjustment ring, wherein the adjustment ring and the second light guide are connected with each other. The adjustment ring provides for an easy adjustment of the adjustment insert and hence for an easy adjustment of the air stream flowing out through the air vent. The connection of adjustment ring and second light guide is a particularly simple and reliable possibility of coupling the rotation of the adjustment insert with the rotation of the backlightable portion.

Preferably, the adjustment insert can comprise a decorative ring in which the backlightable portion is arranged. Among other things, the decorative ring serves for facing the gap between adjustment insert and the housing of the air vent. By arranging the backlightable portion on the decorative ring, a plurality of functional elements of the adjustment insert can be combined in a single component. In addition, this provides for an optically appealing design. For example, the decorative ring can be clipped onto the adjustment ring or be attached to the same.

In addition, it can be provided that the backlightable portion is an on-off symbol. This symbol is used worldwide and due to its widespread use is understood almost everywhere on the world. As compared to systems known so far the operability of the air vent thus is improved distinctly. In addition, the operator can recognize at one sight whether the air vent is closed or open. With reference to the position of the backlightable portion, the operator also can recognize the current setting of the air vent.

It is possible that the air vent may be illuminated when the vehicle is opened or started or when the illumination of the vehicle is switched on.

Furthermore, it is possible that the light intensity can be increased with increased opening of the flaps of the air vent.

Preferably, the second light guide includes a light receiving portion, by means of which the light from the first light guide can be transmitted to the second light guide in a channeled manner. Transmission losses of the light between the first end the second light guide thereby are reduced.

Furthermore, it can be provided that the first and the second light guide do not contact each other. This prevents jamming of the first and the second light guide and ensures that the first and the second light guide can easily be rotated against each other. Between the first and the second light guide a gap of less than one millimeter can be provided.

In addition, the adjustment insert can include a first rotary stop and a second rotary stop, which define an actuation range for the adjustment insert. The adjustment insert can be rotatable exclusively between the first rotary stop and the second rotary stop. An adjustment of the air stream flowing out through the air vent is effected between the first and the second rotary stop. In the position of the first rotary stop no air flows through the air vent, and in the position of the second rotary stop air flows through the air vent with maximum air mass flow.

Furthermore, a switching device can be provided, which switches the illumination of the air vent on or off, and it can be provided that reaching or leaving the first rotary stop actuates the switching device.

In the position of the first rotary stop the air vent preferably is closed, so that no air flows out through the air vent, and that in the position of the second rotary stop the air vent is maximally opened.

In particular, the adjustment device can comprise at least one transmission element for actuating a flap mechanism of the air vent, wherein by means of the transmission element the switching device can be actuated at the same time.

BRIEF DESCRIPTION OF THE DRAWINGS

Further features and advantages of the invention can be taken from the following description and from the following drawings to which reference is made. In the drawings.

DETAILED DESCRIPTION OF THE INVENTION

Figure 1:
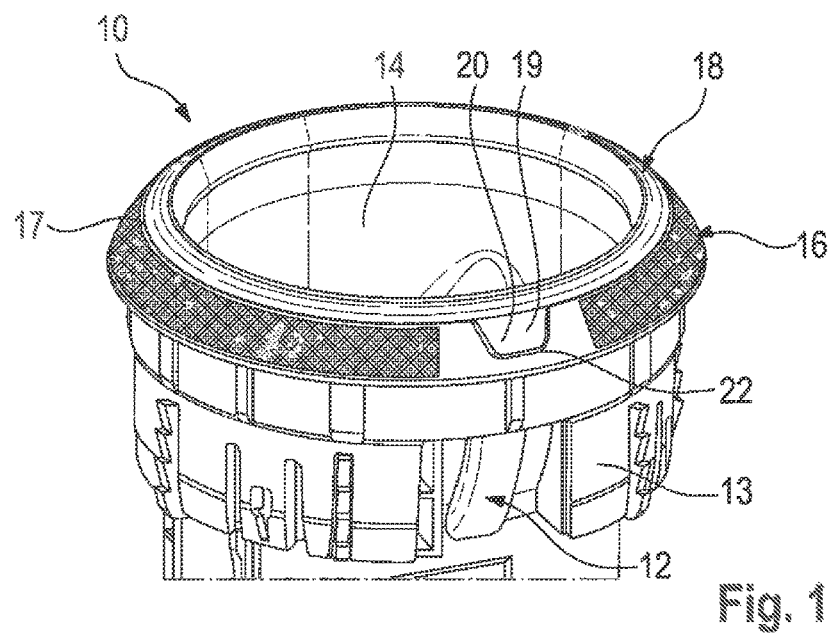
FIG. 1 shows a perspective view of the most relevant components of an air vent according to the invention.

FIG. 1 shows a perspective view of an exemplary embodiment of an air vent 10 according to the invention for a motor vehicle. There are shown only those components which are necessary or helpful for the understanding of the invention.

The air vent 10 includes a housing 12, which e.g. is inserted into the dashboard of a motor vehicle.

At the housing 12 a contact ring 13 is mounted. The contact ring 13 serves for fixing the air vent 10 e.g. in the non-illustrated dashboard.

The air vent 10 furthermore includes an adjustment insert 14. As external components, the adjustment insert 14 includes an adjustment ring 16 and a decorative ring 18.

The decorative ring 18 is clipped into the adjustment ring 16 and thus firmly connected with the adjustment ring 16. In addition, the adjustment ring 16 includes a nose 19 with a backlightable portion 20.

The air vent 10 and its components, i.e. the housing 12, the adjustment insert 14, the adjustment ring 16, the decorative ring 18 and the backlightable portion 20 are made of plastics.

The backlightable portion 20 is arranged in the nose 19 of the decorative ring 18, which is integrally formed at the decorative ring 18. The shape of the nose 19 approximately is trapezoidal and is rounded at the corners.

The adjustment ring 16 includes a ring-shaped groove 17, into which the decorative ring 18 is clipped.

In the region of the backlightable portion 20, the adjustment ring 16 includes an inversely trapezoidal recess 22 which encloses the nose 19 at its edges, but does not conceal the same.

Figure 7:
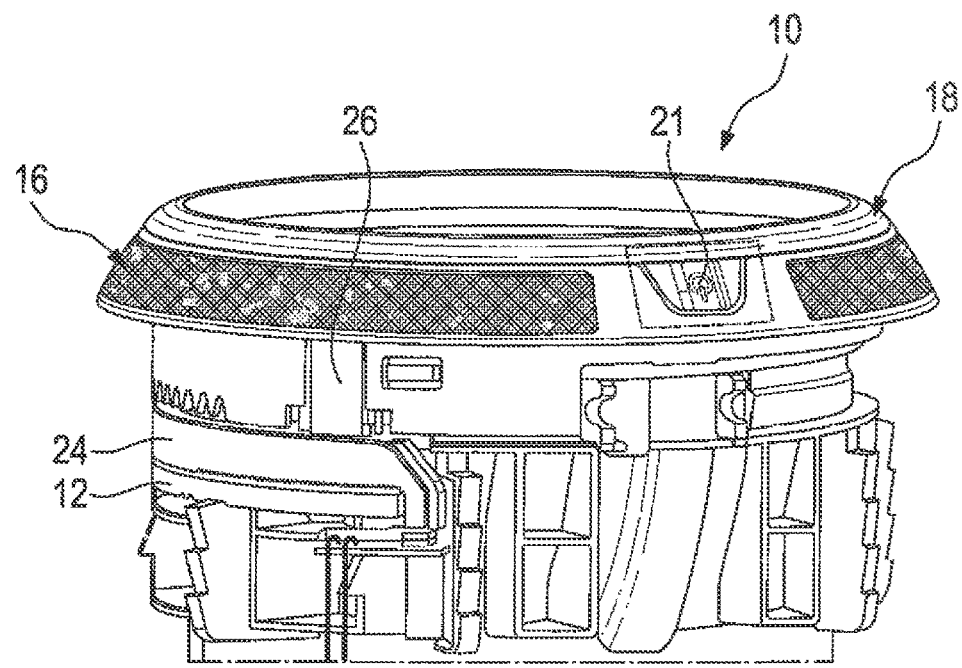
FIG. 7 shows a perspective top view of the two light guides of the air vent according to FIG. 1.
Figure 8:
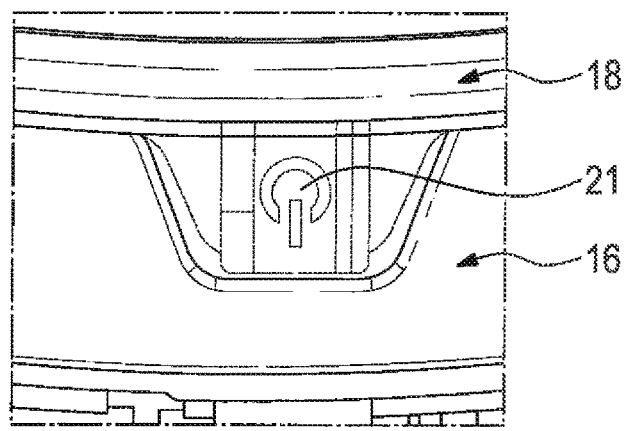
FIG. 8 shows a perspective detail view of the backlightable portion of the adjustment insert of the air vent according to FIG. 1.

The backlightable portion 20 is an on-off symbol 21 (cf. FIG. 7 and FIG. 8).

Figure 2:
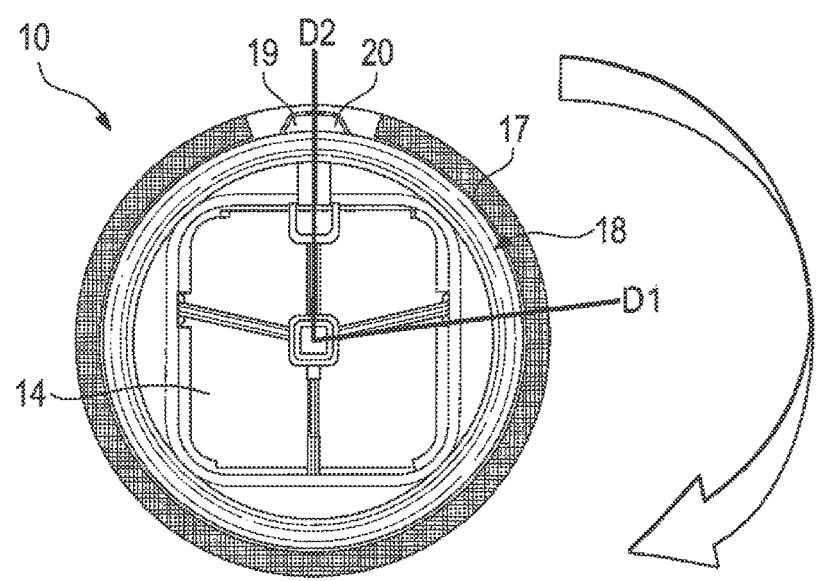
FIG. 2 shows a top view of the air vent according to FIG. 1.

FIG. 2 shows a top view of the air vent 10 according to FIG. 1. The slat packages of the air vent 10 are not shown here.

As shown in FIG. 2, the adjustment insert 14 includes a first rotary stop D1 and a second rotary stop D2, which define an actuation range for the adjustment insert 14. Between the rotary stop D1 and the rotary stop D2 an actuation range of about 80° is present, which is defined by the rotary stop D1 and the rotary stop D2.

Alternatively, however, it can be provided for example that the first rotary stop is arranged at about "3:00 p.m." and the second rotary stop at about "9:00 a.m.". This results in an actuation range of about 180°.

Figure 3:
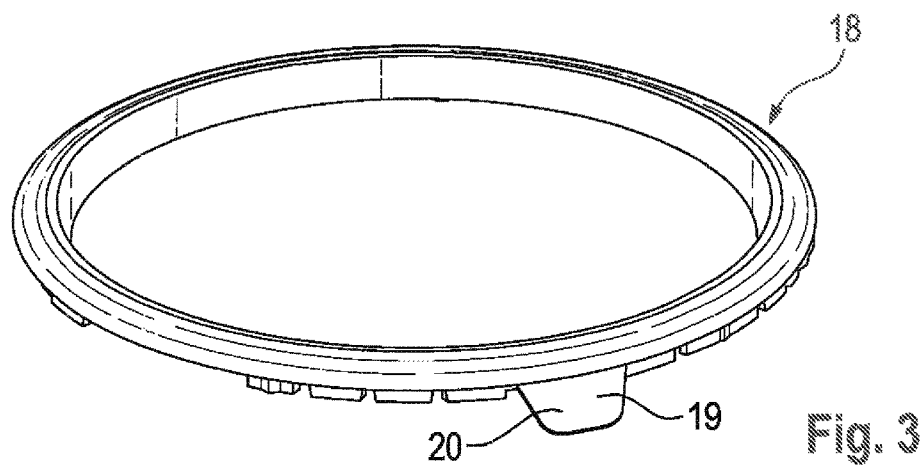
FIG. 3 shows a perspective view of the decorative ring of the air vent according to FIG. 1.

FIG. 3 shows a perspective view of the decorative ring 18 of the air vent 10.

The decorative ring 18 has an upper side which is visible after insertion into the adjustment ring 16 and protrudes from the adjustment ring 16. Preferably, the decorative ring 18 and the adjustment ring 16 are formed such that after insertion the external surfaces of the decorative ring 18 and of the adjustment ring 16 do not form a step.

Figure 4:
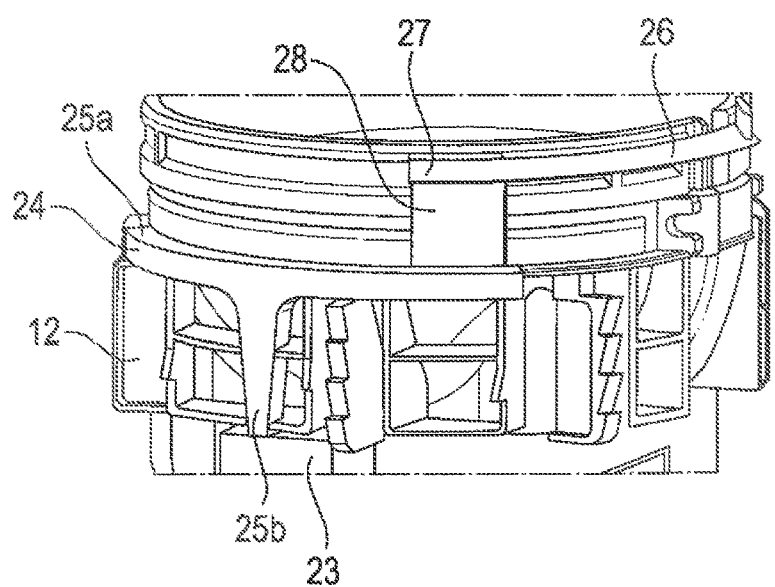
FIG. 4 shows a perspective detail view of the light guides of the air vent according to FIG. 1.

FIG. 4 shows a perspective detail view of the first light guide 24 and the second light guide 26 of the air vent 10.

The first light guide 24 is attached to the housing 12 and includes a web-like portion 25a. The web-like portion 25a is bent and with its curvature adapted to the curvature of the surface of the housing 12.

It is possible that the first light guide 24 is totally or partially made of a illuminatable foil.

In the exemplary embodiment shown here, the first light guide 24 is clipped into the housing 12.

Figure 5:
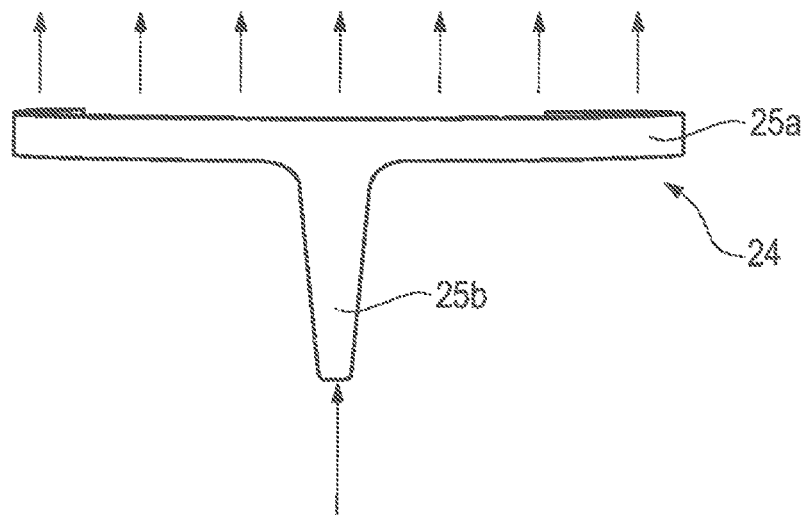
FIG. 5 shows a schematic view of the first light guide of the air vent according to FIG. 1.

The first light guide 24 furthermore includes a light coupling portion 25b, which is formed as nose- or lance-like protrusion (cf. also FIG. 5). In the mounted condition, the light coupling portion 25b points in direction of the inflow region of the air vent 10 and thus is oriented opposite to the outflow direction.

The tip of the light coupling portion 25b is arranged in the vicinity of one or more LEDs. The used LED or the used LEDs may be RGB-LED(s).

FIG. 4 shows the LED housing 23 in which a plurality of LEDs are arranged.

Alternatively, however, it can be provided that no LED housing is provided. The LED or the LEDs can directly be fixed (e.g. clipped) in the vent housing. In this connection it is possible that the LED or the LEDs are partly covered by the contact ring 13 (cf. FIG. 1).

Furthermore, the adjustment ring 16 and the second light guide 28 are firmly connected with each other. The second light guide 26 here is dipped into the adjustment ring 16.

The second light guide 26 has a web-like portion 27, which is bent and with its curvature is adapted to the curvature of the surface of the adjustment ring 16.

In addition, the second light guide 26 includes a light receiving portion 28. The light receiving portion 28 is integrally molded to the second light guide 26 and in the mounted condition is located between the web-like portion 25a of the first light guide 24 and the web-like portion 27 of the second light guide.

The first light guide 24 and the second light guide 26 do not contact each other, because between the light receiving portion 28 and the web-like portion 25a of the first light guide 24 a gap 30 is present. This gap 30 for example has a height of less than one millimeter. In the illustrated exemplary embodiment the gap 30 has a height of about 0.5 mm.

Figure 6:
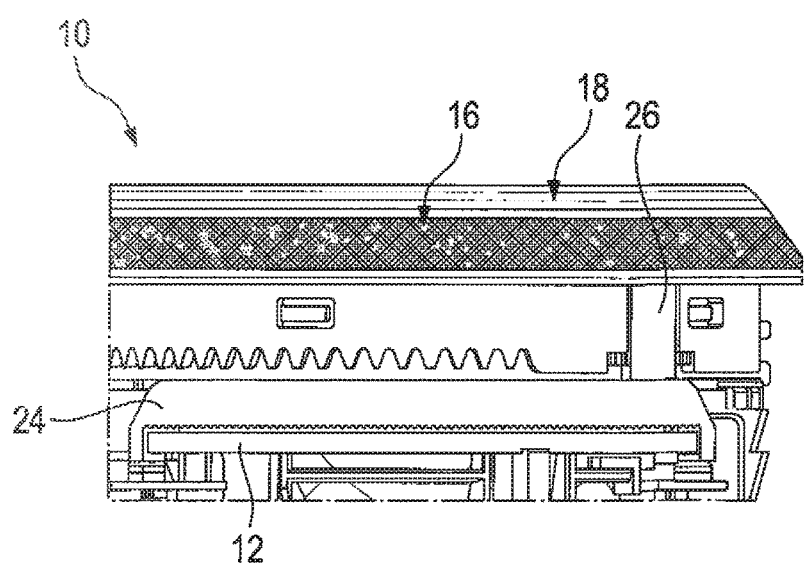
FIG. 6 shows a perspective side view of the two light guides of the air vent according to FIG. 1.

FIG. 6 shows a perspective side view of the two light guides 24, 26 of the air vent 10. The light guide 24 is clipped into the housing 12 of the air vent 10.

In contrast to FIG. 4, the adjustment ring 16 and the decorative ring 18 are mounted already in FIG. 6. FIG. 7 shows the mounted condition according to FIG. 6. The on-off symbol 21 can be seen clearly in FIGS. 7 and 8.

Figure 9:
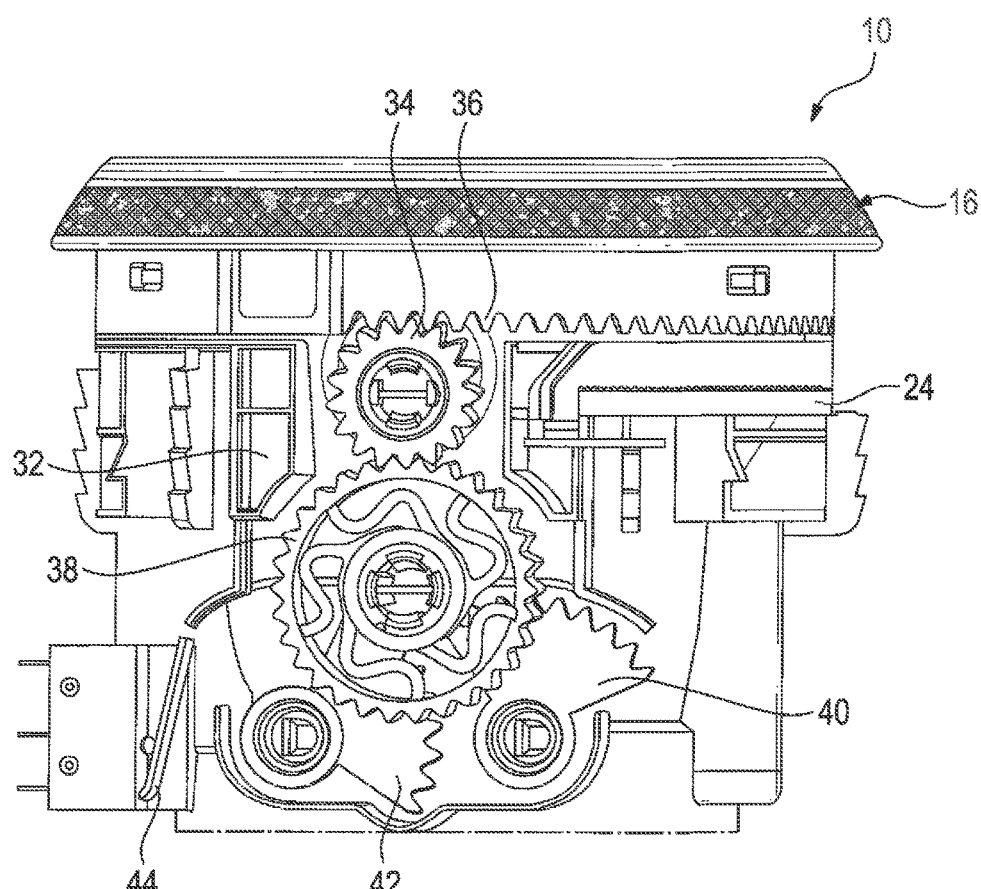
FIG. 9 shows a perspective side view of the flap mechanism of the air vent according to FIG. 1.

FIG. 9 shows a perspective side view of the flap actuating transmission 32 of the air vent 10.

The flap actuating transmission 32 comprises a first gear wheel 34 which meshes with a toothing 36 of the adjustment ring 16. This first gear wheel 34 furthermore meshes with a second gear wheel 33. The second gear wheel 38 is connected with the levers 40 and 42 via non-illustrated toothing means.

At the height of the levers 40 and 42, an LED on-off switch 44 is provided. This LED on-off switch 44 is optional and part of a possible embodiment of the invention. In principle, however, it is also conceivable that such LED on-off switch 44 is not provided.

The function and adjustment of the air vent 10 will be described below:

The adjustment insert 14 is rotatable exclusively between the first rotary step D1 and the second rotary stop D2 (cf. FIG. 2). The adjustment of the air outflow is effected exclusively between the first and the second rotary stop D1 and D2.

By rotating the adjustment ring 16, the same rotates the first gear wheel 34 with its toothing 36. This gear wheel 34 in turn meshes with the second gear wheel 38, and the levers 40 and 42 are adjusted corresponding to the rotation of the adjustment ring 16. The non-illustrated flaps of the air vent are opened, partly opened or closed corresponding to the rotation of the adjustment ring 16.

When the adjustment insert 14 is in the position of the first rotary stop D1, there is no outflow through the air vent 10. In this position, the on-off symbol 21 of the air vent 10 also is switched off.

In the position of the second rotary stop D2, the full outflow is effected through the air vent 10. In this position, the on-off symbol 21 of the air vent 10 is switched on.

The illumination of the on-off symbol 21 can be dimmed.

It is possible that the air vent 10 may be illuminated, when the vehicle is opened or started or when the illumination of the vehicle is switched on.

Furthermore, it is possible that the light intensity can be increased with increased opening of the flaps of the air vent 10.

It can be provided that the brightness of the illumination of the on-off symbol 21 conforms to the air volume flow. The LED on-off switch 44 is part of a switching device which switches the illumination of the on-off symbol 21 of the air vent 10 on or off. Reaching or leaving the first rotary stop D1 actuates the switching device, because the lever 42 is rotated against the LED on-off switch 44 and depresses the same.

When the LEO on-off switch 44 is depressed, the LEDs are switched off.

It is possible that switching on the LEDs only is effected when the adjustment ring 16 has been rotated from the zero position of the first rotary stop D1 by about 10° in direction of the second rotary stop D2.

When the LEDs are switched on, the light omitted by the LEDs in the LED housing 23 is received via the light coupling portion 25 and radiated via the web-like portion 25a (see also FIG. 5).

By means of at least one RGB-LED, the colour of the illumination may be adjusted or selected freely by the driver. It is also possible that the colour of the illumination is preselectable or adjustable according to driving modes of the manufacturer. For example, an ECO mode may have a green illumination and a sport mode a red illumination etc.

The light receiving portion 28 of the second light guide 26 receives the light radiated by the web-like portion 25a and channels it.

Via the web-like portion 27, the backlightable portion 20, i.e. the on-off symbol 21, always can be illuminated with constant light intensity in the possible rotary positions.

The second light guide 26 substantially is homogeneously illuminated by the first light guide 24 over the entire adjustment range. Thus, the backlightable portion 20 also is backlit with the same intensity with the illumination switched on.

Due to the fact that there is a gap between the web-like portion 25a and the light receiving portion 28, the first light guide 24 and the second light guide 26 are rotatable against each other.

The invention claimed is:

1. An air vent with an adjustment insert for adjusting an air stream flowing out through the air vent, wherein the air stream is adjustable by rotating the adjustment insert, comprising at least a first light guide and at least a second light guide, wherein the first light guide is firmly attached to a housing of the air vent and said second light guide is firmly attached to the adjustment insert, wherein the first light guide includes a light coupling portion connected to a curved first portion, wherein the curved first portion has a first curvature that is adapted to an outer surface portion of the housing, wherein the curved first portion at least partially extends around the outer surface portion of the housing, wherein the light coupling portion has a tip that is configured to receive light, wherein the second light guide includes a curved second portion connected to a light receiving portion, wherein the first light guide and the second light guide are rotatable with respect to each other and the second light guide is configured to be illuminated by the first light guide, wherein the light coupling portion of the first light guide is configured to receive the light and the curved first portion of the first light guide is configured to radiate the light, and wherein the light receiving portion of the second light guide is configured to receive the light radiated by the curved first portion and channel the light into the curved second portion of the second light guide, and a backlightable portion of the adjustment insert is configured to be illuminated by the second light guide.

2. The air vent of claim 1 wherein the adjustment insert comprises an adjustment ring, the adjustment ring and the second light guide being connected with each other.

3. The air vent of claim 1 wherein the adjustment insert comprises a decorative ring that is secured in an adjustment ring, wherein the decorative ring includes a nose having a trapezoidal shape and rounded at corners, wherein the adjustment ring includes an inversely trapezoidal recess that encloses edges of the nose, wherein the backlightable portion is arranged in the decorative ring.

4. The air vent of claim 3 wherein the backlightable portion includes a graphic on-off symbol.

5. The air vent of claim 1 wherein the first and the second light guides do not contact each other.

6. The air vent of claim 1 wherein the adjustment insert includes a first rotary stop and a second rotary stop, the first and second rotary stops defining an actuation range for the adjustment insert.

7. The air vent of claim 6 wherein a switch is provided, the switch being adapted for switching an illumination of the air vent on or off, the switch configured to be actuated by the first rotary stop reaching the switch.

8. The air vent of claim 7 wherein the adjustment insert comprises at least one flap actuating transmission, the flap actuating transmission element allowing a simultaneous actuation of the switch, wherein the flap actuating transmission comprises a first gear wheel that meshes with a toothing of the adjustment insert and a second gear wheel connected to one or more levers.

9. The air vent of claim 6 wherein the air vent is closed when the first rotary stop is active, preventing air from flowing from the air vent, and the air vent being in a fully open condition when the second rotary stop is active.

10. The air vent of claim 1, wherein each of the first and second light guides is formed of illuminatable foil.

11. The air vent of claim 1, wherein the curved second portion has a second curvature that is adapted to the outer surface portion of the housing.

12. An air vent comprising:
a housing;
an adjustment insert rotatably coupled to the housing, wherein the adjustment insert is configured to adjust an air stream by rotation of the adjustment insert relative to the housing;
a first light guide coupled to housing wherein the first light guide includes a light coupling portion connected to a curved first portion, wherein the curved first portion has a first curvature that is adapted to an outer surface portion of the housing, wherein the curved first portion at least partially extends around the outer surface portion of the housing;
a second light guide coupled to the adjustment insert, wherein the second light guide includes a curved second portion connected to a light receiving portion, wherein the second light guide is rotatable relative to the first light guide, wherein the second light guide is configured to be illuminated by the first light guide wherein the light coupling portion of the first light guide is configured to receive the light and the curved first portion of the first light guide is configured to radiate the light, and wherein the light receiving portion of the second light guide is configured to receive the light radiated by the curved first portion and channel the light into the curved second portion of the second light guide.

13. The air vent of claim 12, wherein the adjustment insert comprises an adjustment ring that connects to the second light guide.

14. The air vent of claim 12, wherein the adjustment insert comprises a decorative ring that supports a backlightable portion.

15. The air vent of claim 14, further comprising a backlightable portion connected to the adjustment insert, wherein the backlightable portion is configured to be illuminated by the second light guide wherein the backlightable portion includes a graphic on-off symbol.

16. The air vent of claim 12, wherein the first light guide does not contact the second light guide.

17. The air vent of claim 12, wherein the adjustment insert includes a first rotary stop and a second rotary stop, the first and second rotary stops defining an actuation range for the adjustment insert.

18. The air vent of claim 17, further comprising a switch that is configured to switch illumination of the air vent on or off, the switch configured to be actuated by the first rotary stop reaching the switch, wherein the air vent is closed when the first rotary stop is active, preventing air from flowing from the air vent, and the air vent being in a fully open condition when the second rotary stop is active, wherein the adjustment insert comprises at least one flap actuating transmission, the flap actuating transmission allowing a simultaneous actuation of the device, wherein the flap actuating transmission comprises a first gear wheel that meshes with a toothing of the adjustment insert and a second gear wheel connected to one or more levers.

19. The air vent of claim 12, wherein each of the first and second light guides is formed of illuminatable foil.

20. The air vent of claim 12, wherein the curved second portion has a second curvature that is adapted to the outer surface portion of the housing.

* * * * *